Patented Oct. 7, 1947

2,428,759

UNITED STATES PATENT OFFICE 2,428,759

ANTHRAQUINONE THIOXANTHONE CARBAZOLES IN WHICH THE ANTHRAQUINONE THIOXANTHONE NUCLEUS IS LINKED TO THE CARBAZOLE NUCLEUS THROUGH AN AMIDE LINKAGE

Fritz Max, Easton, Pa., and David I. Randall, Phillipsburg, N. J., assignors to General Aniline & Film Corporation, New York, N. Y., a corporation of Delaware No Drawing. Application December 12, 1946, Serial No. 715,654

4 Claims. (Cl. 260—316)

The present invention relates to the preparation of vat dyes of the thioxanthone carbazole type and more particularly to such dyes wherein the thioxanthone radical is linked to the carbazole anthraquinone radical by an amide linkage.

Thioxanthone and its simply substituted derivatives have been proposed by the art for utilization as dyes. These compounds, however, have little utility in this relationship for the reason that they are weakly colored and have very little affinity for textile fibers (see German Patents 243,587 and 231,854). It has been proposed to overcome such defects in said compounds by reacting the same with anthraquinones. For example, in German Patent 231,854, 1-amino-5,6-anthraquinone thioxanthone is condensed with α-chlor-anthraquinone to produce compounds in which the amino group in the one position of the thioxanthone is substituted by an anthraquinone radical. United States Patent 999,785 which is a counterpart of said German patent however, emphasizes the fact that these compounds dye cotton in shades ranging from red to grayish blue.

In our copending application Serial No. 629,196 filed November 16, 1945, we have disclosed a class of anthraquinone carbazole thioxanthones which have the ability of dying vegetable fibers from a hydrosulfite vat in shades ranging from orange to red-brown. However, in these dyestuffs all of the nuclei are linked together by condensed ring systems.

We have now discovered a further class of anthraquinone thioxanthone carbazoles which are typified by the fact that the thioxanthone and carbazole anthraquinone nuclei are linked together by an amide linkage. The new compounds have the ability of dyeing fibers, particularly vegetable fibers such as cotton, in very pleasing strong brown to currant shades.

It is accordingly an object of the present invention to provide a class of anthraquinone thioxanthone carbazoles in which the thioxanthone radical is linked to the carbazole anthraquinone radical through an amide linkage.

It is a further object of the present invention to provide anthraquinone thioxanthone carbazoles which are capable of dyeing vegetable fibers in strong pleasing shades ranging from brown to currant.

Other further and important objects of the present invention will become apparent as the description proceeds.

The new class of compounds contemplated herein are depicted by the following structural formula:

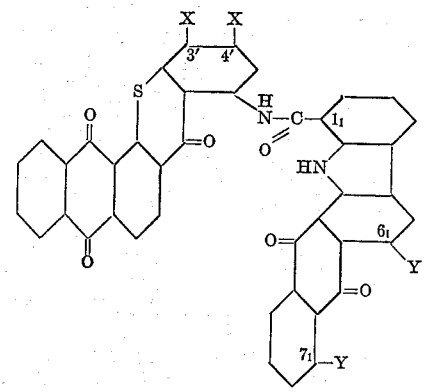

in which X is hydrogen, alkyl such as methyl, ethyl, propyl, butyl, amyl, octyl, cetyl and the like; alkoxy, such as methoxy, ethoxy, propoxy, butyroxy and the like; halogen such as chlorine, bromine, fluorine and the like; aryl such as phenyl, methyl phenyl, methoxy phenyl and the like, and Y is hydrogen or a benzamido radical such as benzamido, p-methyl-benzamido, p-chlor-benzamido, p-methoxy-benzamido and the like.

Compounds embraced by the above formula are prepared by condensing an anthraquinone-2,1-(S)-1',2'-(S)-6'-(o-halogen benzamido)-thioxanthone with a 1-amino anthraquinone which may contain in the 4- or 5-position a benzamido radical of the type illustrated above and then ring closing the resulting compound. The condensation is effected by heating the reactants to a temperature of about 190–250° C. in the presence of an acid acceptor such as soda ash, potassium carbonate, sodium acetate and the like, and copper or a salt of copper, such as copper acetate.

The ring closure is effected by heating the intermediate condensation product at a temperature ranging from about 50–125° C. in the presence of an acid-condensing agent. Suitable acid-condensing agents are concentrated sulfuric acid, phosphoric acid or a metal-chloride in the presence of a non-basic organic solvent. As metal chlorides may be employed, aluminum chloride, ferric chloride and the like. Examples of non-basic organic solvents are nitrobenzene, nitrotoluene, dinitrobenzene, tetrachlorethane, chlorobenzene, etc.

Suitable thioxanthones for forming the intermediate condensation products are:

Anthraquinone-2.1-(S)-1'.2'-(S) - 6'-(o-chlorbenzamido)-thioxanthone;

Anthraquinone - 2.1-(S)-1'.2'-(S)-3' - chlor-6'-(o-chlorbenzamido)-thioxanthone;

Anthraquinone-2.1-(S)-1'.2' - (S) - 3'.4'-dichlor-6'-(o-chlorbenzamido)-thioxanthone;

Anthraquinone-2.1 - (S) - 1'.2' - (S) - 3' - methoxy-6'-(o-chlorbenzamido)-thioxanthone;

Anthraquinone-2.1-(S)-1'.2'-(S) - 3'-phenyl-6'-(o-chlorbenzamido)-thioxanthone;

Anthraquinone-2.1 - (S)-1'.2'-(S)-3'-phenoxy-6'-(o-chlorbenzamido)-thioxanthone;

Anthraquinone-2.1-(S)-1'.2'-(S) - 3' - bromo-6'-(o-chlorbenzamido)-thioxanthone;

Anthraquinone-2.1 - (S) - 1'.2' - (S)-3'.4'-dimethoxy-6'-(o-chlorbenzamido) - thioxanthone;

Anthraquinone-2.1-(S) - 1'.2'-(S) - 4'-phenyl-6'-(o-chlorbenzamido)-thioxanthone;

Anthraquinone-2.1-(S)-1'.2' - (S)-3'-ethyl-6'-(o-chlorbenzamido)-thioxanthone;

Anthraquinone - 2.1-(S)-1'.2' - (S) - 3'.4' - dimethyl-6'-(o-chlorbenzamido)-thioxanthone;

Anthraquinone-2.1 - (S)-1'.2'-(S)-4' - propyl-6'-(o-chlorbenzamido)-thioxanthone.

As examples of 1-amino-anthraquinones which may be employed, reference is made to 1-aminoanthraquinone, 1-amino-4-benzamido anthraquinone, 1-amino-5-benzamido anthraquinone, 1-amino-5-p-chlor-benzamido anthraquinone, 1-amino-4-p-methoxy-benzamido anthraquinone, 1-amino-5-p-methyl-benzamido anthraquinone, 1 - amino-4-p-chlor-benzamido anthraquinone, and the like.

The manner in which the compounds of the present invention are formed is indicated by the following equation assuming the utilization of anthraquinone-2.1 - (S) - 1'.2'(S)-3'-chlor - 6' - (o-chlorbenzamido)-thioxanthone and 1-amino-5-benzamido anthraquinone as the reactants.

braced by the above formula. For the sake of brevity the nomenclature used below refers to the indicated formula.

(1) 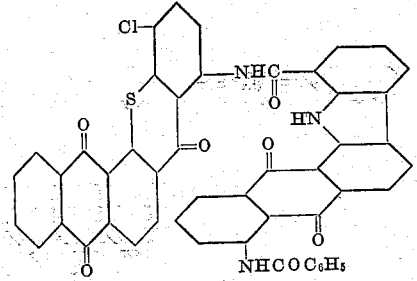

(2) 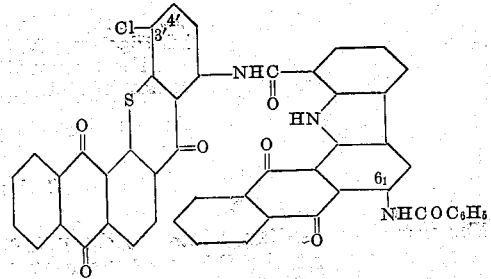

(3) 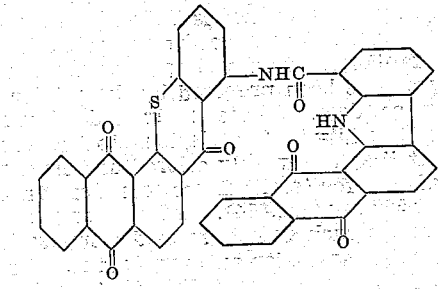

(4) The compound is the same as that of Formula 1, excepting that the 3' position is substituted by methoxy.

(5) The compound is the same as that of Formula 1, excepting that the 7₁ position is unsubstituted.

(6) The compound is the same as that of For-

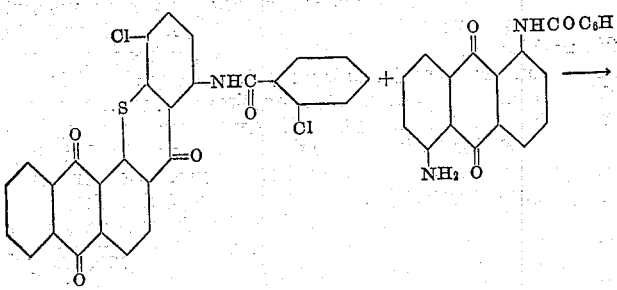

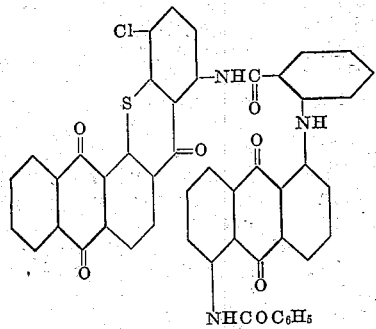 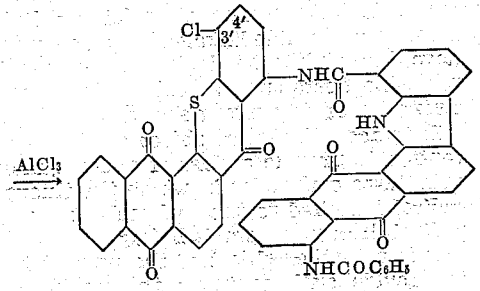

The following is illustrative of compounds within the scope of the present invention and embraced by the above formula.

mula 2, excepting that the 3' position is substituted by methoxy.

(7) The compound is the same as that of Formula 2, excepting that the 6₁ position is unsubstituted.

(8) The compound is the same as that of Formula 1, excepting that the 3',4' positions are substituted by chlorine.

(9) The compound is the same as that of Formula 2, excepting that the 3' position is substituted by bromine.

(10) The compound is the same as that of Formula 1, excepting that the 7₁ position is substituted by p-methoxy-benzamido.

(11) The compound is the same as that of Formula 1, excepting that the 3' position is substituted by phenyl.

(12) The compound is the same as that of Formula 2, excepting that the 3' position is substituted by phenoxy.

(13) The compound is the same as that of Formula 2, excepting that the 3' and 4' positions are substituted by methoxy.

(14) The compound is the same as that of Formula 1, excepting that the 4' position is substituted by ethyl.

(15) The compound is the same as that of Formula 1, excepting that the 3' and 4' positions are substituted by methyl.

(16) The compound is the same as that of Formula 2, excepting that the 4' position is substituted by propyl.

The following examples further illustrate the invention, parts being by weight unless otherwise stated. It is to be understood, however, that the following are exemplary only and are not limitative of the invention.

*Example 1.*—A mixture of 7.0 parts of anthraquinone-2.1-(S)-1'.2'-(S)-3'-chlor-6' - (o-chlorbenzamido)-thioxanthone, 4.0 parts of 1-amino-4-benzamido anthraquinone, 4.0 parts of soda ash, 1.0 part of copper acetate and 108 parts of nitrobenzene are heated at 210° C. for 4 hours. The solution is then cooled to 30° C. and the condensation product is isolated by filtration. The resulting powder is washed with alcohol, dilute hydrochloric acid and water. It dyes cotton grayish-violet shades from a violet vat.

For carbazolation, 7.0 parts of the condensation product are dissolved in a solution of 33 parts of aluminum chloride and 120 parts of nitrobenzene. After the solution has been heated for 2 hours at 50–60° C. it changes in color from green to violet. The reaction mixture is then poured into dilute hydrochloric acid, the nitrobenzene removed by steam distillation and the reaction mixture filtered. The product is a violet-brown powder which dyes cotton from a violet bath in current shades of excellent fastness properties.

*Example 2.*—A similar product is obtained by replacing the 1-amino-4-benzamido anthraquinone by 1-amino-5-benzamido anthraquinone and proceeding otherwise as in Example 1.

*Example 3.*—The procedure is the same as in Example 1, excepting that the thioxanthone of Example 1 is replaced by anthraquinone-2.1-(S)-1'.2'-(S)-3'-methoxy-6' - (o - chlorbenzamido) - thioxanthone.

Various modifications of the invention will be apparent to persons skilled in the art and we therefore do not intend to be limited in the patent granted except as required by the prior art and the appended claims.

We claim:

1. Vat dyes of the following structural formula:

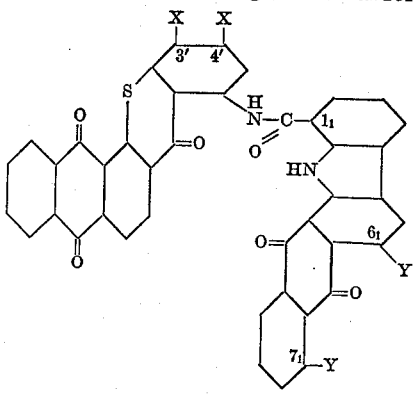

wherein X is a member of the class consisting of hydrogen, alkyl, alkoxy, aryl, aryloxy and halogen and Y is a member of the class consisting of hydrogen and a benzamido group.

2. A vat dye of the following constitution:

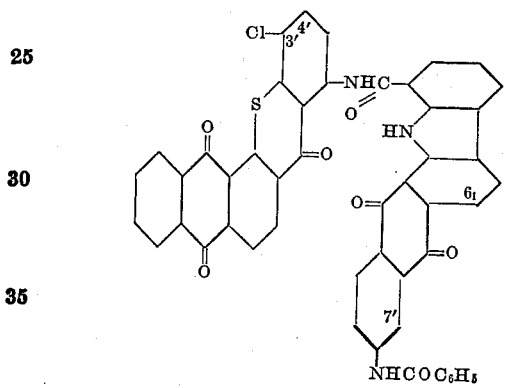

capable of dying cotton fibers in brown to currant shades.

3. A vat dye of the following constitution:

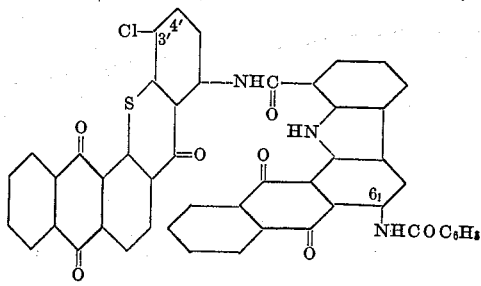

capable of dying cotton in brown to currant shades.

4. A vat dye of the following constitution:

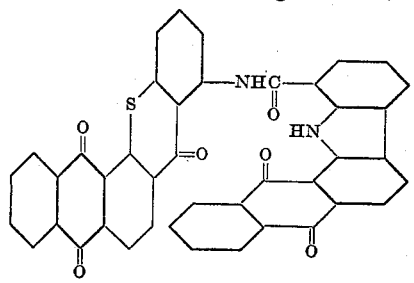

capable of dying cotton from brown to currant shades.

FRITZ MAX.
DAVID I. RANDALL.

Certificate of Correction

Patent No. 2,428,759.                                              October 7, 1947.

FRITZ MAX ET AL.

It is hereby certified that error appears in the printed specification of the above numbered patent, requiring correction as follows: Column 6, lines 35 to 38 inclusive, claim 2, for that portion of the formula reading and that the said Letters Patent should be read with this correction therein that the same may conform to the record of the case in the Patent Office.

Signed and sealed this 24th day of August, A. D. 1948.

[SEAL]

THOMAS F. MURPHY,
*Assistant Commissioner of Patents.*